United States Patent [19]

Kaji et al.

[11] 4,053,812
[45] Oct. 11, 1977

[54] SYSTEM FOR DRIVING A DISPLAY DEVICE

[75] Inventors: Tetsunori Kaji; Masashi Mizushima, both of Hachioji, Japan

[73] Assignee: Hitachi, Ltd., Japan

[21] Appl. No.: 565,267

[22] Filed: Apr. 4, 1975

[30] Foreign Application Priority Data

Apr. 5, 1974 Japan .................. 49-37955

[51] Int. Cl.² ............................. H05B 37/00
[52] U.S. Cl. ................. 315/169 TV; 315/169 R
[58] Field of Search ............. 315/169 TV, 169 R; 307/263, 268

[56] References Cited

U.S. PATENT DOCUMENTS

| 3,343,128 | 9/1967 | Rogers | 315/169 R X |
| 3,522,473 | 8/1970 | Babb | 315/169 R |
| 3,821,599 | 6/1974 | Peters | 315/169 TV |

Primary Examiner—Lawrence J. Dahl
Attorney, Agent, or Firm—Craig & Antonelli

[57] ABSTRACT

A system for driving a display device having photo elements driven by pulsed current from pulsed current sources in which the firing voltage or operating voltage of the photo elements differs from the extinction voltage thereof. The system includes apparatus for setting the voltage applied to the photo elements to a value less than the extinction voltage at a time near the trailing edge of the pulsed current.

22 Claims, 29 Drawing Figures

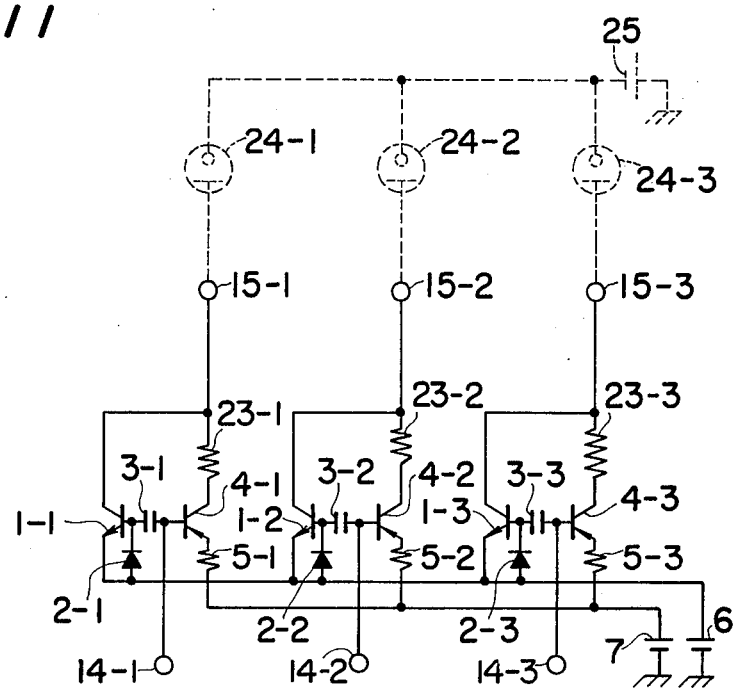
FIG. 11
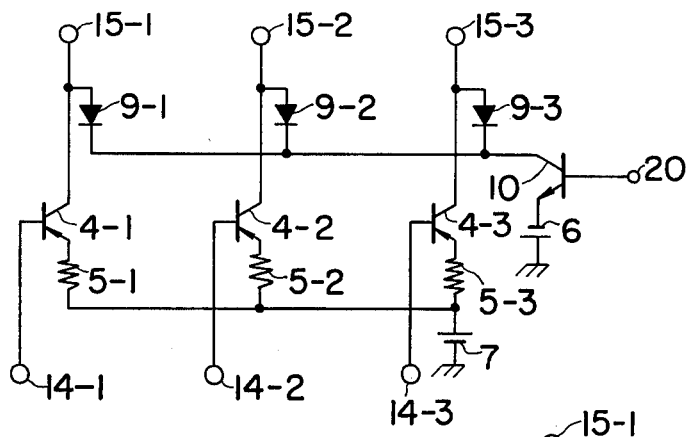
FIG. 12
FIG. 13
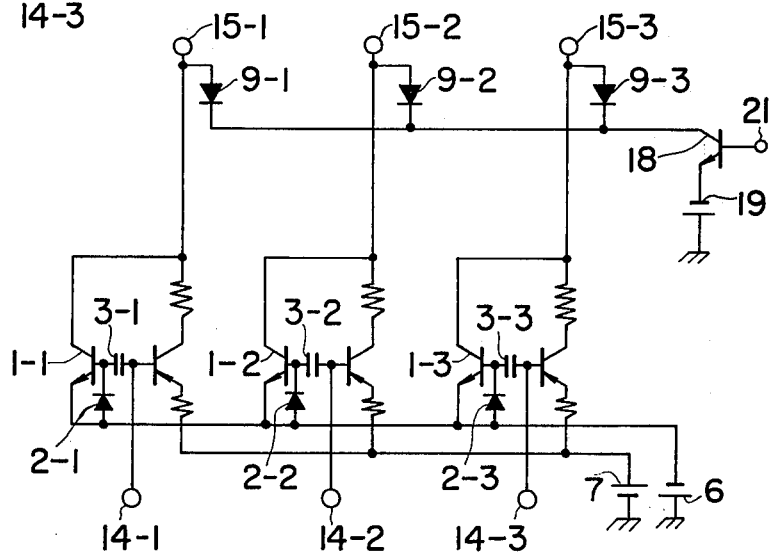

SYSTEM FOR DRIVING A DISPLAY DEVICE

BACKGROUND OF THE INVENTION

1. Field of the Invention

This invention relates to a system for driving a display device including photo elements in which the voltage for firing the photo element (which is hereinafter termed a firing voltage $V_B$) or the operating voltage (which is hereinafter termed $V_A$) differs from the voltage for erasing the luminescene (which is hereinafter termed an extinction voltage $V_M$). That is, the invention is directed to a display device of the type wherein the relation of voltages is $V_M < V_B$ or $V_M < V_A$.

An element which operates in accordance with the relation $V_M < V_B$ is the known gas discharge photo element, a photo diode having a negative resistance characteristic. An electro-luminescene element having a positive resistance characteristic, as well known, provides the relation $V_M < V_A$.

Although the following explanation is directed to the gas discharge photo element (which is hereinafter called a discharge element for simplicity), such explanation is also applicable to the other above-described elements.

In conventional driving systems for the discharge elements, stray capacitance formed between the two electrodes of the discharge element is charged by pulsed current from a pulsed current source and the charge of the discharge element is discharged when the charge voltage of the stray capacitance rises above the firing voltage $V_B$. The discharge of the discharge element is erased when the voltage of the stray capacitance falls below the extinction voltage $V_M$ after cut off of the pulsed current.

In such a system, a ratio of maximum luminance of the discharge element to minimum luminance thereof is almost 3:1 because of very high minimum luminance. Therefore, such a system has a defect that the contrast of displayed picture is insufficient. This defect becomes more apparent as the value of the stray capacitance, etc. become larger.

SUMMARY OF THE INVENTION

An object of the present invention is to provide a driving system for a display device which can obtain the displayed picture having sufficient contrast by reducing the minimum luminance.

To provide such an object, the present invention is characterized by the provision of means for effecting compulsary reduction of the voltage applied to the photo element to less than the extinction voltage $V_M$ at the time near the trailing edge of the pulsed current from the pulsed current source.

These and other objects, features and advantages of the present invention will become more apparent from the following description when taken in connection with the accompanying drawings which shows, for purposes of illustration only, several embodiments in accordance with the present invention.

BRIEF DESCRIPTION OF THE DRAWINGS

FIGS. 5a to 7a are circuit diagrams of other embodiments of the driving system according to the present invention, respectively.

FIGS. 5b to 7b are diagrams showing operating waveforms of circuits shown in FIGS. 5a to 7a, respectively.

FIGS. 11 and 12 are circuit diagrams showing embodiments of constructions of the driving system shown in FIG. 4a, respectively.

FIGS. 13 and 14 are circuit diagrams showing embodiments of constructions of the driving system shown in FIG. 5a, respectively.

DETAILED DESCRIPTION OF THE INVENTION

Figure 1:
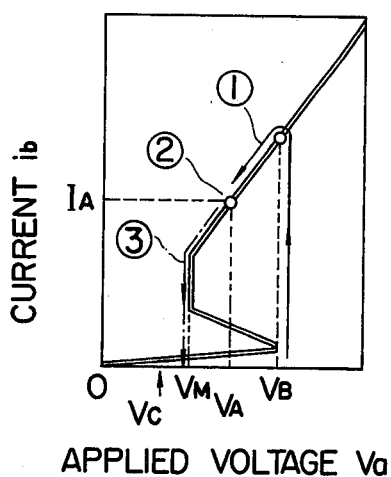
FIG. 1 is a diagram showing a voltage to current characteristic of the discharge element.

FIG. 1 shows a representative voltage to current characteristic of a discharge element in which there is the operating voltage $V_A$ between the firing voltage $V_B$ and the extinction voltage $V_M$. In practice, the voltage to current characteristic is changed sharply by the width of the pulsed current, existence of subsidiary discharge (priming discharge), etc. For example, in case of the presence of the subsidiary discharge, the discharge element does not have a negative resistance characteristic and has a voltage relation of $V_M \approx V_B < V_A$.

Although the following explanation is mainly directed to the voltage to current characteristic shown in FIG. 1, the voltage to current characteristic according to the present invention is not limited to such characteristic as shown in FIG. 1. There is the below-mentioned problem in the case that the pulse width of the pulsed current from the pulsed current source is changed for pulse width modulation, in a driving system utilizing a discharge element having a characteristic as shown in FIG. 1.

Figure 2A:
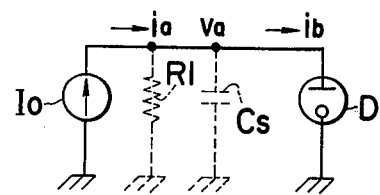
FIGS. 2a and 2b are diagrams showing a circuit and operating waveforms for explaining a conventional driving system, respectively.

FIG. 2a a simplified equivalent circuit of such a driving system. In FIG. 2a, $i_a$ represents the pulsed current flowing out from the pulsed current source I, $i_b$ the current flowing in an anode of a discharge element D, and $v_a$ voltage applied between the anode and ground. In general, there is formed a stray capacitance $C_S$ between the anode and ground.

Figure 2B:
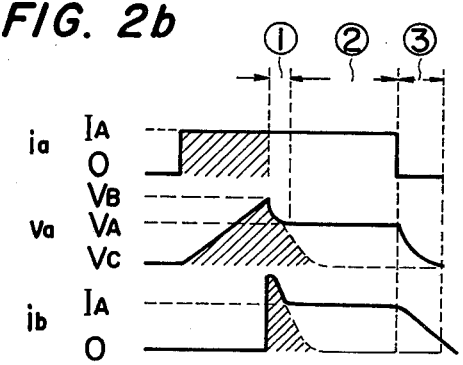

FIG. 2b shows waveforms of the voltage and the current at the respective points of a circuit shown in FIG. 2a. Anode voltage $v_a$ of the discharge element D is increased linearly as the stray capacitance is charged by the pulsed current from the pulsed current source $I_o$. When the anode voltage has risen higher than the firing voltage $V_B$ of the discharge element D, the discharge element becomes conductive and provides light. The current $i_b$ and the voltage $v_a$ of the discharge element D reach from values via a course ① to $I_A$ and $V_A$ at an operating points ②, respectively. The current $i_b$ and the voltage $v_a$ become values at a course ③ after cut off of the current $i_a$, thereby erasing the discharge of the discharge element D.

In a conventional discharge element, the amount of luminance is increased as the current $i_b$ is increased. In a representative case, the current $i_b$ is proportional to the amount of luminance. Therefore, the waveform of luminescence is similar to the waveform of the current $i_b$. That is, the discharge element luminesces with maximum luminance when the discharge is started, and it temporarily maintains luminescence by the charge stored in the stray capacitance after cut off of the current $i_a$.

The pulse width of the current $i_a$ from the pulsed current source $I_o$ is narrowed in accordance with the degree of luminance discharge possible and $v_a = V_B$ is necessary to perform discharge. If the current $i_a$ is cut off when $v_a$ has become equal to $V_B$, then the discharge element D luminesces with minimum luminance. The waveforms of $i_a$, $i_b$ and $v_a$ for such a case are shown at a oblique line part of FIG. 2b.

It follows that the discharge element D may be made conductive via the course ① and ③ in FIG. 1 without holding at the operating point ②. In such a case, the amount of the charge, $Q_L$, lost by the discharge is represented by the following formula.

$$Q_L = C_S(V_B - V_M)$$

$Q_L$ has a large value in practice.

For example, a case is assumed in which a television picture is displayed by a panel having a multiplicity of discharge elements, and in which the amount of luminance is proportional to the product of the amplitude and the width of pulsed current, that is, the amount of the charge. Since the value of $C_S$ is 100 pF and the value of $(V_B - V_M)$ is 100 V in a normal panel, the value of $Q_L$ which determines the minimum luminance $B_{L1}$ becomes $10^{-8}$ coulomb.

Figure 3:
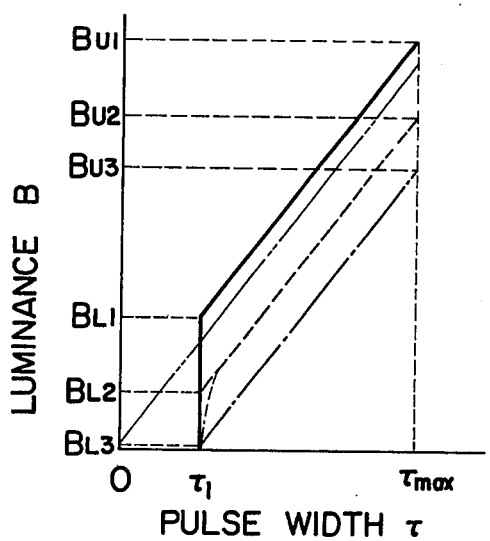
FIG. 3 is a diagram showing luminance characteristics of discharge elements according to the prior art and the present invention.

The maximum luminance $B_{U1}$ in such a case corresponds to that in the case wherein the pulse width is equal to horizontal scanning period (63.5 μS). If it is assumed that the value of current $I_A$ at the operating point corresponds to 0.5 mA, the amount of the charge $Q_{U1}$ lost with the maximum luminance is almost $3 \times 10^{-8}$ coulomb. Therefore, a ratio of the maximum luminance $B_{U1}$ to the minimum luminance $B_{L1}$ is equal to a ratio of $Q_{U1}$ to $Q_{L1}$, that is, 3:1. A luminance characteristic in which the pulse width $\tau$ is changed, is shown in solid line in FIG. 3.

In above-mentioned prior art system, the contrast of the picture is insufficient since the ratio of $B_{U1}$ to $B_{L1}$ is small notwithstanding that large value thereof, for example, 30:1 is normally desired. Such insufficiency is remarkable in the case where the value of $C_S$ and/or $(V_B - V_M)$ becomes larger or the operating current $I_A$ and/or maximum pulse width $\tau$ max becomes smaller. A system in which a resistor R1 is connected in parallel to the pulsed current source $I_o$ is known for removing such defect. However, such system has defects that the extent of improvement of the contrast is reduced when the value of resistor R1 is larger, and non-constant current driving and an amount of power consumption are caused when the value is inversely smaller.

Figure 4A:
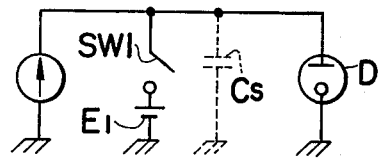
FIGS. 4a and 4b are diagrams showing a circuit and operating waveforms of an embodiment of a driving system according to the present invention, respectively.
Figure 4B:
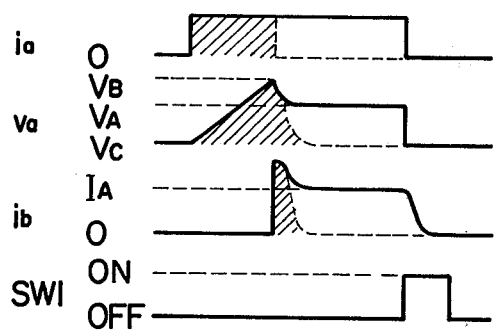

FIG. 4a shows an embodiment of a driving system according to the present invention, in which the amount of luminescence generated at the course ③ in FIG. 1 is reduced. In the system, a series circuit of a switch SW1 and a power source $E_1$ is connected between an anode of a discharge element D and ground. The charge stored in the capacity $C_S$ is compulsorily discharged by the switch SW1 when the current $i_a$ is cut off, whereby voltage applied to the discharge element D is reduced by the source $E_1$ to the extinction voltage $V_M$ or voltage $V_C$ such as shown in FIG. 4b.

The amount of luminescence generated at the course ③ {the amount of the charge contributed to the luminance is $C_S(V_A - V_M)$} is eliminated, thereby reducing the minimum luminance to $B_{L2}$. The amount of charge, $Q_{L2}$ {equal to $C_S(V_B - V_A)$}, contributing to the minimum luminance $B_{L2}$ is smaller than the amount of charge, $Q_{L1}$ {equal to $C_S(V_B - V_M)$}, contributing to the minimum luminance $B_{L1}$ in prior art system. Therefore, the system according to the present invention can display the picture having excellent gradation, since the minimum luminance is reduced whereby a ratio of the maximum luminance $B_{U2}$ {$\approx B_{U1} - (B_{L1} - B_{L2})$} to the minimum luminance $B_{L2}$ becomes larger in comparison with the prior art system. Specifically, in the system utilizing the discharge elements with relation of $V_B \leq V_A$, the amount of the charge contributing to the minimum luminance $B_{L2}$ becomes theoretically zero. Thus, the minimum luminance is remarkably reduced, thereby displaying the picture with sufficient contrast.

On the other hand, in the discharge element with the relation of $V_B > V_A$ such as shown in FIG. 1, the minimum luminance is determined by the amount of luminescence generated with the charge corresponding to $C_S(V_B - V_A)$. Such a characteristic is shown in broken line in FIG. 3 with the characteristic being represented by a line in the neighborhood of the pulse width $\tau 1$.

Figure 5B:
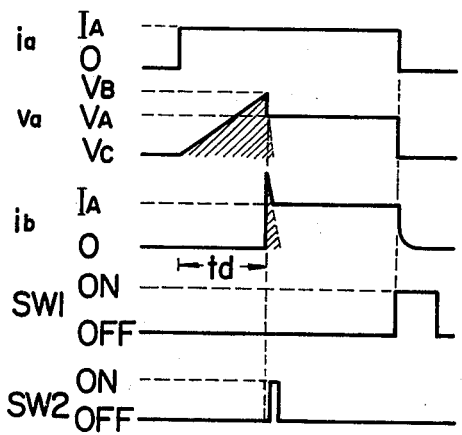
Figure 5A:
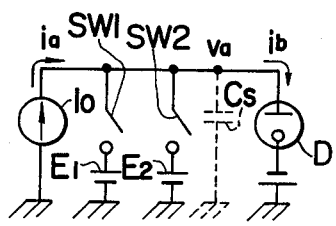

Minimum luminance $B_{L3}$ can be reduced more if the amount of luminescence generated at the courses ① and ③ shown in FIG. 1 can be reduced. FIG. 5a shows another embodiment of the system according to the present invention in which a greater reduction of the minimum luminance is achieved. In the system, a series circuit of a switch SW2 and a power source $E_2$ is further added to the system shown in FIG. 4a and is connected between the anode of the discharge element D and ground. The switch SW2 is closed as soon as the discharge element D is fired, thereby compulsorily setting the anode voltage $v_a$ to a voltage near to or less than the operating voltage $V_A$. The amount of the charge, $Q_{L3}$, contributing to the minimum luminance $B_{L3}$ becomes theoretically zero by utilizing the switches SW1 and SW2. Even if the discharge element D has the relation of $V_A < V_B$, the minimum luminance is remarkably reduced, thereby displaying the picture with sufficient contrast in the system shown in FIG. 5a. An example of such a characteristic is shown by the single dotted chain line in FIG. 3.

In the system utilizing a multiplicity of discharge elements such as a discharge panel in which the discharge elements are arranged in a matrix, there is the case that the value of the stray capacitance, discharge delay time or the firing voltage differ for every discharge element. In such a case, the pulse width $\tau_1$ for starting the discharge is changed for every discharge element. Although it is desirable to change the timing for closing the switch SW2 for every discharge element, such a change of the timing is difficult in practice. Furthermore, there is a case that pulse width $\tau_1$ corresponding to each discharge element changes broadly with the lapse of time. Thus, it is undesirable to utilize the system shown in FIG. 5a in such a case.

Figure 6A:
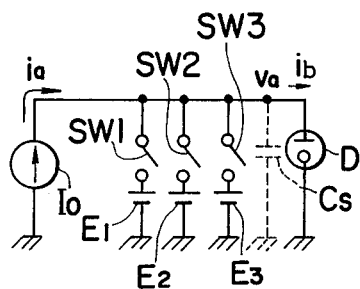

FIG. 6a shows another embodiment of the system according to the present invention, in which the voltage $v_a$ is compulsorily set greater than the firing voltage $V_B$ at the forward end or edge of the current $i_a$, for aligning the discharge firing time. In FIG. 6a, a series circuit of a switch SW3 and a power source $E_3$ is further added to the system shown in FIG. 5a, and is connected between the anode of the discharge element D and ground. The switch SW3 is closed at a time near to the forward end of the current $i_a$, thereby setting anode voltage $v_a$ greater than the firing voltage $V_B$ with the source $E_3$ so as to compulsorily make the discharge element D conductive. Thus, the discharge firing time is not influenced by the change of value of the capacitance and characteristic of the respective discharge elements, and can be accomplished fast.

Figure 7A:
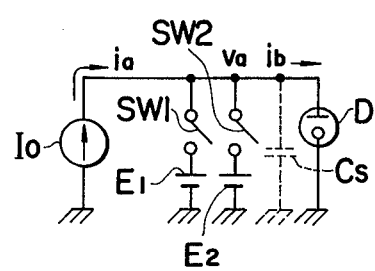
Figure 7B:
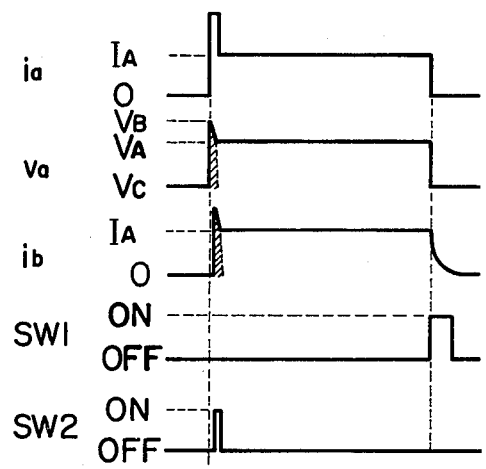

FIG. 7a shows another embodiment of the system according to the present invention for aligning the discharge firing time. The system of FIG. 7a corresponds to the system of FIG. 5a in construction. However, in the system of FIG. 7a, the current $i_a$, the amplitude of which is larger at the time near to the forward edge of the current $i_a$ as shown in FIG. 7b, flows from the pulsed current source $I_o$. Thus, the voltage $v_a$ is rapidly set to greater than $V_B$ so as to align the discharge firing time. The systems shown in FIGS. 6a and 7a enable a reduction of the disadvantages caused by unbalance of the respective discharge elements and an increase of the maximum luminance. Such a characteristic is shown by the double dotted chain line in FIG. 3.

In the case of a system utiling a discharge element in which the firing voltage $V_B$ is less than the operating voltage $V_A$, the switches SW2 shown in FIGS. 6a and 7a are eliminated. In such a case, it is desired to set the voltage of the power source $E_3$ shown in FIG. 6a to a voltage such that the voltage applied to the discharge element D is almost equal to the operating voltage $V_A$.

Figure 8A:
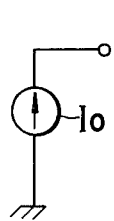
FIGS. 8a and 8b are circuit diagrams showing embodiments of the pulsed current source, respectively.
Figure 8B:
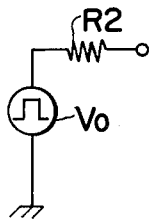

In above-mentioned embodiments, the pulsed current source $I_o$ is an ideal current source in which interior impedance is infinite, as shown in FIG. 8a. As the pulsed current source $I_o$, a circuit in which a resistor R2 is connected in series to a pulsed voltage source $V_o$ as shown in FIG. 8b, can be utilized.

Figure 9A:
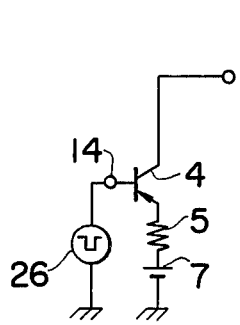
FIGS. 9a and 9b are circuit diagrams showing embodiments of constructions of circuits shown in FIGS. 8a and 8b, respectively.
Figure 9B:
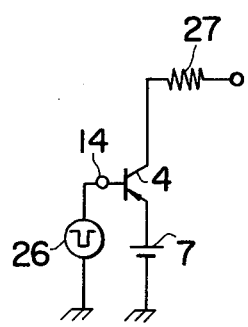

An embodiment of the pulsed current source of FIG. 8a is shown in FIG. 9a, in which a power source 7, an emitter connected resistor 5 and a transistor 4 are connected in series, the base of the transistor 4 being connected to a pulsed voltage source 26. An embodiment of the circuit of FIG. 8b is shown in FIG. 9b, in which a power source 7, a transistor 4 and a resistor 27 are connected in series, the base of the transistor 4 being connected to a pulsed voltage source 26. A terminal 14 of FIGS. 9a and 9b is provided to apply voltage of the pulsed voltage source 26. Although the circuit of FIG. 9a is used as the pulsed current source in the embodiments, described below, such description is only for explanatory purposes and the present invention is not limited to the utilization of such circuit.

FIG. 11 shows an embodiment of a construction of the system shown in FIG. 4a, for driving three discharge elements 24-1, 24-2 and 24-3. A pulse width modulated input signal of FIG. 10a, in which the pulse width $\tau_w$ changes corresponding to brightness of the picture and the position of the backward end or trailing edge changes corresponding to the pulse width $\tau_w$, is applied to terminals 14-1, 14-2 and 14-3. The input pulse signal is converted to a pulsed current by transistors 4-1, 4-2, 4-3 and emitter resistors 5-1, 5-2, 5-3. The switch SW1 of FIG. 4a comprises transistors 1-1, 1-2, 1-3 diodes 2-1, 2-2, 2-3 and condensers 3-1, 3-2, 3-3 in FIG. 11. The transistors 1-1, 1-2 and 1-3 are conducted for a constant period from the trailing edge of the input signal, thereby setting the voltage applied to the discharge elements 24-1, 24-2 and 24-3 to a value less than the extinction voltage $V_M$ with a power source 6. Although the cathode of the discharge element D shown in FIG. 4a is connected directly to ground, the cathodes of the discharge elements 24-1, 24-2 and 24-3 shown in FIG. 11 are, in common, connected to a power source 25 to a lower voltage applied to the terminals 14-1, 14-2 and 14-3. Resistors 23-1, 23-2 and 23-3 are provided to prevent destruction of the respective discharge elements 24-1, 24-2 and 24-3 caused by over current of the transistors 4-1, 4-2 and 4-3 due to destruction thereof. The resistance of the resistors 23 is less than 1/5 of output impedance of the pulsed current source comprising the transistor 4 and the emitter resistor 5. Since the destruction preventing resistors 23 are fundamentally connected between the pulsed current source and the discharge elements 24, each resistor may be connected between one of terminals 15-1, 15-2 and 15-3 and the associated discharge element 24.

In the following described embodiments the drawings illustrate only the portion of the circuit present between the terminals 14 and 15.

In FIG. 11, the switch SW1 comprising the transistor 1, the diode 2 and the condenser 3 is provided for every discharge element. Thus, a complicated circuit construction is provided. In the case that a pulse width modulated input signal of FIG. 10b, in which the pulse width $\tau_w$ changes corresponding to brightness of the picture and the position of forward edge changes corresponding to the pulse width $\tau_w$, is applied to the terminal 14, the circuit construction can be simplified as shown in FIG. 12.

In FIG. 12, the switch SW1 of FIG. 4a is used in common to three discharge elements and is comprised of diodes 9-1, 9-2, 9-3 and a common transistor 10. To a terminal 20, is applied a pulse for conducting the transistor 10 for a predetermined period from the trailing edge of the input pulse shown in FIG. 10b. The circuit of FIG. 12 is applicable to a circuit in which the position of the trailing edge of the input signal is fixed, thus, the circuit of FIG. 12 is used, for example, in the case wherein the gradation of the picture is represented with the combination of pulse signals and the pulse width of the signals being fixed to $\tau_A$, $\tau_B$ and $\tau_C$ as shown in FIG. 10c.

Figure 10A:
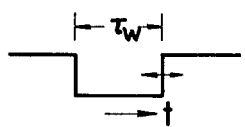
FIGS. 10a, 10b and 10c are diagrams showing waveforms of input voltage pulses, respectively.
Figure 10B:
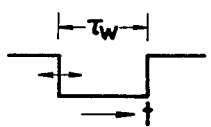
Figure 14:
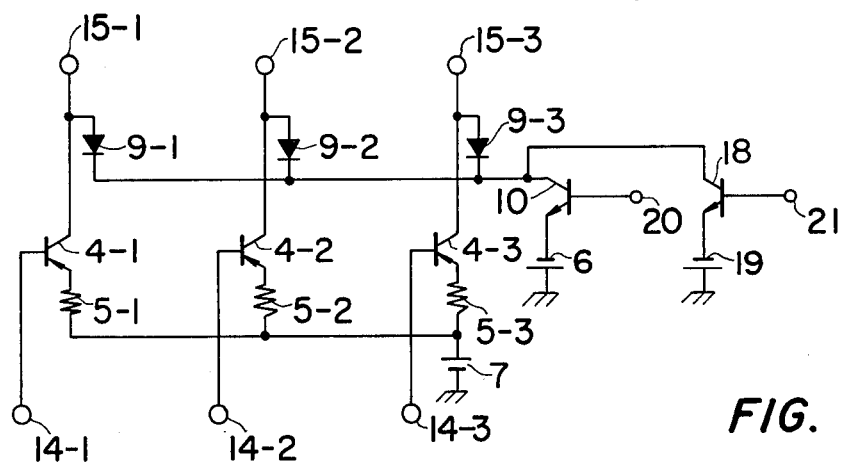

FIGS. 13 and 14 illustrate other embodiments of the system shown in FIG. 5a. FIG. 13 illustrates an embodiment of the system in which the position of the trailing edge of the input signal is changed as shown in FIG. 10a. In FIG. 13, a circuit comprising diodes 9-1, 9-2, 9-3, a transistor 18 and a power source 19 is further added to the circuit of FIG. 11. To a terminal 21, is applied a pulse signal corresponding to a waveform SW2 of FIG. 5b. Voltage of the power source 19 is set to a voltage near to the operating voltage or less than the operating voltage.

Figure 10C:
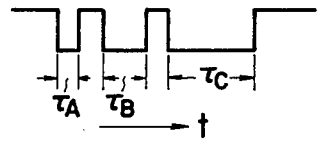

FIG. 14 shows another embodiment of the system of FIG. 5a, in which the positions of forward and trailing edges of the input signal are fixed, for example, as shown in FIG. 10c. In FIG. 14, the switch SW2 comprising a transistor 18 and a power source 19 is further added to the circuit of FIG. 12.

Figure 15:
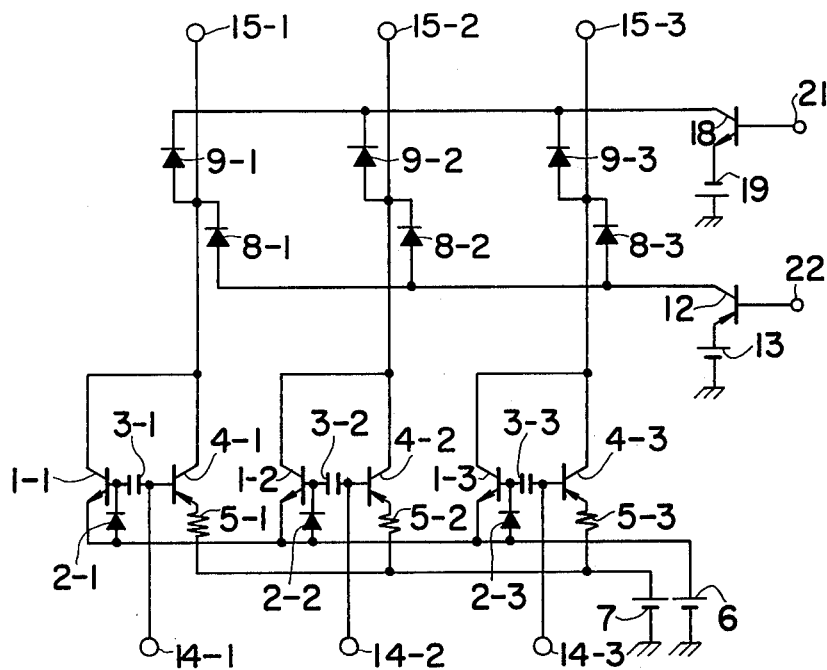
FIGS. 15 and 16 are circuit diagrams showing embodiments of constructions of the driving system shown in FIG. 6a, respectively.
Figure 16:
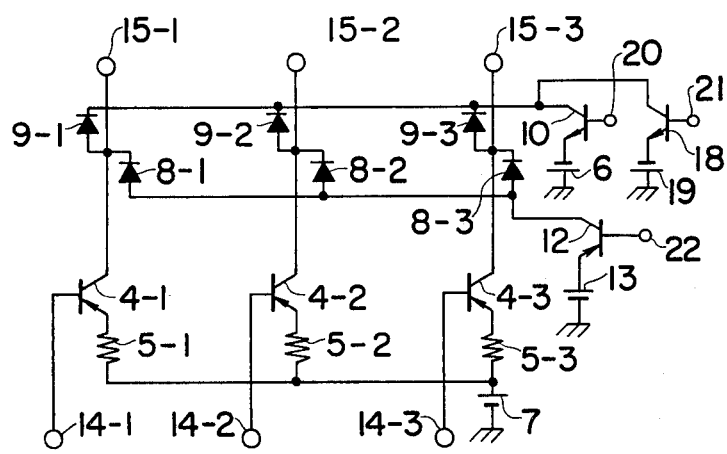

FIGS. 15 and 16 show other embodiments of the system shown in FIG. 6a. FIG. 15 shows an embodiment of the system, in which the position of the forward edge of the input signal is fixed and the position of the trailing edge thereof is changed as shown in FIG. 10a. In FIG. 15, the switch SW3 comprising diodes 8-1, 8-2, 8-3, a transistor 12 and a power source 13 is further added to the circuit of FIG. 13.

Figure 6B:
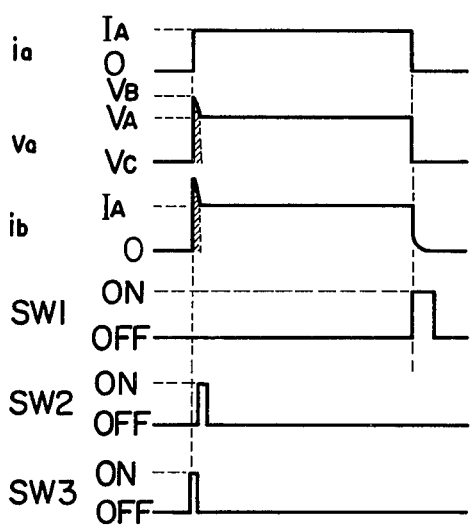

FIG. 16 illustrates another embodiment of the system shown in FIG. 6a, in which the positions of the forward and trailing edges of the input signal are fixed as shown in FIG. 10c. In FIG. 16, the switch SW3 comprising diodes 8-1, 8-2, 8-3, a transistor 12 and a power source 13 is further added to the circuit of FIG. 14. A signal corresponding to waveform SW3 of FIG. 6b is applied to a terminal 22. The source 13 is provided to apply the firing voltage $V_B$ of the discharge element. If the firing voltage $V_B$ is less than operating voltage $V_A$, a voltage near to the operating voltage $V_A$ is applied to the discharge element. In such a case, the transistor 18, the power source 19 and the diode 9 which correspond to the switch SW2 are eliminated.

Figure 17A:
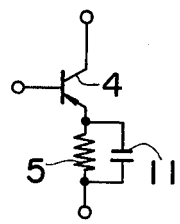
FIGS. 17a and 17b are circuit diagrams showing embodiments of the pulsed current source utilized to the driving system shown in FIG. 7a, respectively.
Figure 17B:
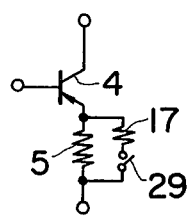

FIGS. 17a, 17b, 18 and 19 illustrate embodiments of the system shown in FIG. 7a. FIGS. 17a and 17b shows embodiments of the pulsed current source $I_o$ from which the current $i_a$ having a large amplitude flows at a time near to the forward edge thereof. In FIGS. 17a, a condenser 11 is connected in parallel to the emitter resistor 5 of FIGS. 9a. In FIG. 17b, a series conduit of a resistor 17 and a switch 29 is connected in parallel to the emitter resistor 5 of FIG. 9a with value of the resistor 17 being less than that of the resistor 5. The switch 29 is temporarily closed at the forward edge of the input signal.

Figure 18:
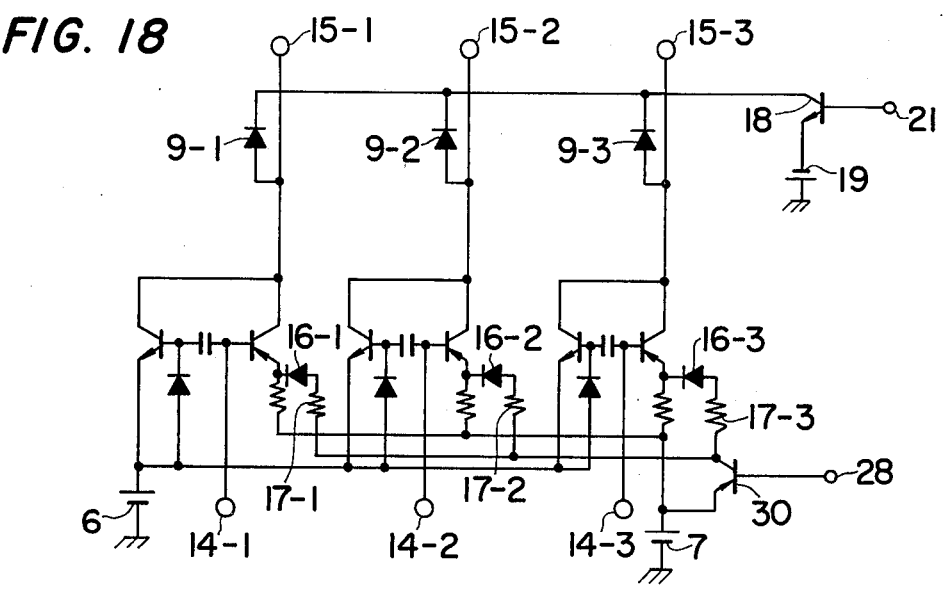
FIGS. 18 and 19 are circuit diagrams showing embodiments of constructions of the driving system shown in FIG. 7a, respectively.

FIG. 18 shows an embodiment of the system shown in FIG. 7a, in which the position of the forward edge of the input signal is fixed and the position of the trailing edge thereof is changed. In FIG. 18, the switch 29 of FIG. 17b comprising diodes 16-1, 16-2, 16-3, a transistor 30 and resistors 17-1, 17-2, 17-3 is further added to the circuit of FIG. 13. A pulse signal with a narrow width is applied to a terminal 28, at a time near to the forward edge of the input signal.

Figure 19:
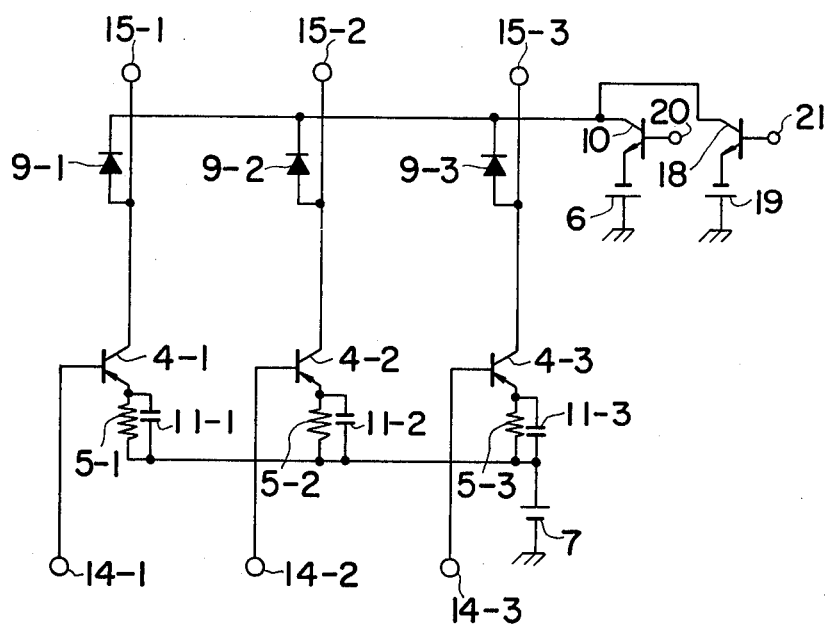

FIG. 19 shows another embodiment of the system shown in FIG. 7a, in which the position of the trailing edge of the input signal is fixed. In FIG. 19, condensers 11-1, 11-2 and 11-3 are further added to the circuit of FIG. 14.

It is noted that a source for driving the discharge element is not limited to the constant current sources as shown in FIGS. 8a and 8b and that, the driving source may be a source which has large impedance at the time of luminance erasing.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of appended claims.

We claim:
1. A system for driving a display device comprising: display means including at least one photo element having characteristics such that each of the firing voltage level and the operating voltage level thereof is greater than the extinction voltage level thereof; current source means connected to said display means for generating a pulsed current to drive said display means; and first setting means connected to said display means for setting the voltage applied to said photo element to a value less than the extinction voltage level thereof at the trailing edge of the pulsed current.

2. A system for driving a display device according to claim 1, further comprising second setting means connected to said display means for setting the value of the voltage applied to said photo element to a value substantially equal to the operating voltage level thereof at the time said photo element is fired.

3. A system for driving a display device according to claim 2, further comprising third setting means connected to said display means for setting the value of the voltage applied to said photo element to a value greater than the firing voltage level thereof at the foward edge of the pulsed current.

4. A system for driving a display device according to claim 2, in which said current source means includes means for providing a pulsed current having an amplitude by which said photo element is fired at the forward edge of the pulsed current.

5. A system for driving a display device according to claim 1, wherein said first setting means includes a first voltage source for generating a voltage having a value less than the extinction voltage level of said photo element and first switching means connected in series with said first voltage source for applying the voltage from said first voltage source to said photo element at the trailing edge of said pulsed current.

6. A system for driving a display device according to claim 2, wherein said second setting means includes a second voltage source for generating a voltage having a value substantially equal to the operating voltage level of said photo element and second switching means connected in series with said second voltage source for applying the voltage from said second voltage source to said photo element at the time said photo element is fired.

7. A system for driving a display device according to claim 3, wherein said third setting means includes a third voltage for generating a voltage having a value greater than the firing voltage level of said photo element and third switching means connected in series with said third voltage source for applying the voltage of said third voltage source to said photo element at the forward edge of the pulsed current.

8. A system for driving a display device according to claim 1, wherein said current source means comprises a source having a constant current characteristic.

9. A system for driving a display device according to claim 1, wherein said current source means comprises a voltage source for generating an input pulse voltage and a resistor connected in series to said voltage source.

10. A system for driving a display device according to claim 8, wherein said current source means comprises a transistor having a first output electrode from which said pulsed current is obtained, a first resistor having one terminal thereof connected to a second output electrode of said transistor, a power source connected to the other terminal of said first resistor, and a pulsed voltage source connected to an input electrode of said transistor.

11. A system for driving a display device according to claim 9, wherein said voltage source includes a transistor having a first output electrode connected to said resistor, a power source connected to a second output electrode of said transistor, and a pulsed voltage source connected to an input electrode of said transistor.

12. A system for driving a display device according to claim 10, wherein said current source means further includes a condenser connected in parallel with said first resistor.

13. A system for driving a display device according to claim 10, wherein said current source further includes a second resistor and a switch connected in series with said second resistor, the series circuit of said second resistor and said switch being connected in parallel with said first resistor.

14. A system for driving a display device according to claim 5, wherein said first switching means comprises first signal terminal means for applying an input voltage pulse, a first transistor having a first output electrode connected to said photo element and a second output electrode connected to said first voltage source, a first diode connected between an input electrode of said first transistor and the second output electrode of said first transistor, and a condenser connected between the input electrode of said first transistor and said first signal terminal means.

15. A system for driving a display device according to claim 5, wherein said display means includes a plurality of photo elements, and said first switching means includes a plurality of first diodes, one terminal of each of said first diodes being connected to a respective photo element, first signal terminal means for applying a first voltage pulse at the trailing edge of the pulsed current, and a first transistor having a first output electrode connected in common to the other terminals of said first diodes, a second output electrode of said first transistor being connected to said first voltage source, and an input electrode of said first transistor being connected to said first signal terminal means.

16. A system for driving a display device according to claim 6, wherein said display means includes a plurality of photo elements, and said second switching means comprises a plurality of diodes, one terminal of each of said diodes being connected to a respective photo element, signal terminal means for applying a voltage pulse at the time said photo elements are fired, and a transistor having a first output electrode connected in common to the other terminals of said diodes, a second output electrode of said transistor being connected to said second voltage source and an input electrode of said transistor being connected to said signal terminal means.

17. A system for driving a display device according to claim 15, further including a second voltage source for generating a voltage having a value substantially equal to the operating voltage level of said photo elements, second signal terminal means for applying a second voltage pulse at the time said photo elements are fired, and a second transistor having a first output electrode connected to the first output electrode of said first transistor, a second output electrode of said second transistor being connected to said second voltage source means and an input electrode of said second transistor being connected to said second signal terminal means.

18. A system for driving a display device according to claim 7, wherein said display means includes a plurality of photo elements, and said third switching means comprises a plurality of diodes, one terminal of each of said diodes being connected to a respective photo element, signal terminal means for applying a voltage pulse at the forward edge of the pulsed current, and a transistor having a first output electrode connected in common to the other terminals of said diodes, a second output electrode of said transistor being connected to said third voltage source and an input electrode of said transistor being connected to said signal terminal means.

19. A system for driving a display device according to claim 17, further including a third voltage source for generating a voltage having a value greater than the firing voltage level of said photo elements, a plurality of second diodes, one terminal of each of said second diodes being connected to a respective photo element, third signal terminal means for applying a third voltage pulse at the forward edge of the pulsed current, and a third transistor having a first output electrode connected in common to the other terminals of said second diodes, a second output electrode of said third transistor being connected to said third voltage source, and an input electrode of said third transistor being connected to said third signal terminal means.

20. A system for driving a display device according to claim 14, wherein said display means includes a plurality of photo elements, and said current source means comprises a second voltage source for generating a predetermined voltage, second signal terminal means for applying a first pulse voltage at the forward edge of the pulsed current, a second transistor having an input electrode connected to said second signal terminal means, a first output electrode, a second output electrode connected to said second voltage source, a plurality of third transistors, each of said third transistors having a first output electrode connected to a respective photo element and each having an input electrode connected to the corresponding first terminal means, a plurality of first resistors connected between a second output electrode of a respective third transistor and the second output electrode of said second transistor, a plurality of second diodes, one terminal of each of said second diodes being connected to the second output electrodes of the respective third transistors, and a plurality of second resistors connected between the other terminals of the respective second diodes and the first output electrode of said second transistor.

21. A system for driving a display device according to claim 20, further including a third voltage source for generating a voltage having a value substantially equal to the operating voltage level of said photo elements, a plurality of third diodes, one terminal of each of said third diodes being connected to the respective photo element, third signal terminal means for applying a second voltage pulse at the time said photo elements are fired, a fourth transistor having a first output electrode connected in common to the other terminals of said third diodes, a second output electrode of said fourth transistor being connected to said third voltage source and an input electrode of said fourth transistor being connected to said third signal terminal means.

22. A system for driving a display means according to claim 17, wherein said current source means comprises a third voltage source for generating a predetermined voltage, a plurality of third signal terminal means for applying input voltage pulses to the corresponding photo element, a plurality of third transistors having a first output electrode connected to a respective photo element and an input electrode connected to the corresponding third terminal means, a plurality of resistors being connected between a second output electrode of the respective third transistors and said third voltage source, and a plurality of condensers, each of said condensers being connected in parallel to a respective resistor.

* * * * *